Dec. 29, 1931.  F. M. SWANSEN  1,838,591
AUTOMOBILE EQUALIZER
Filed May 15, 1929  2 Sheets-Sheet 1
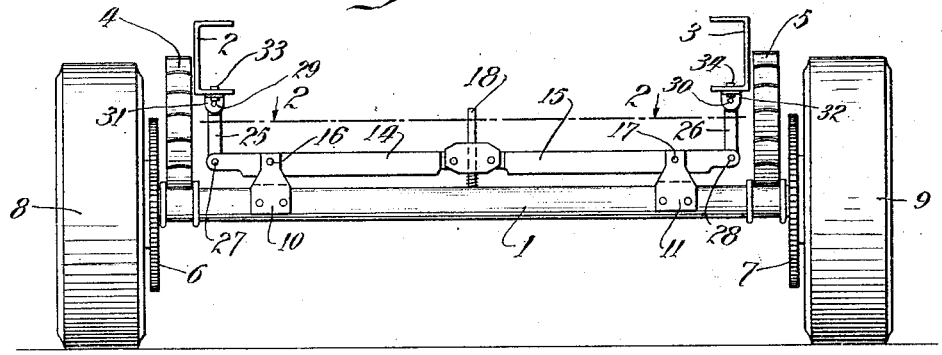
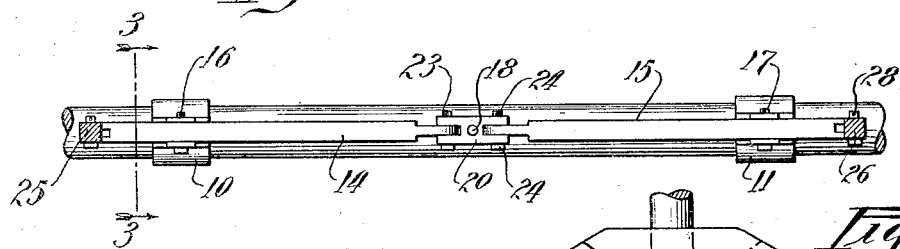
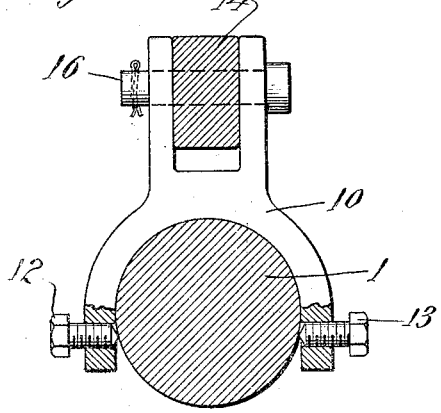
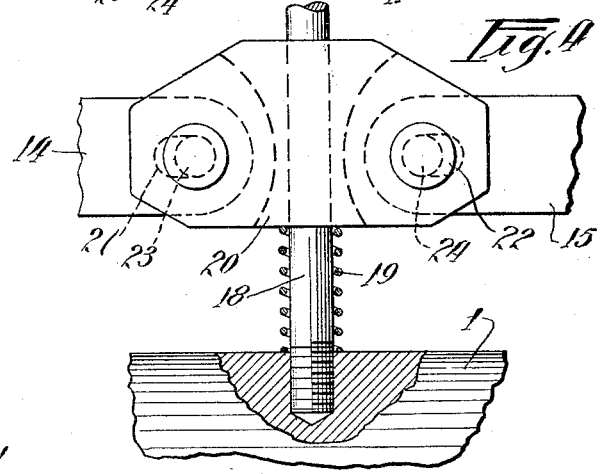
Inventor:
Fredrick M. Swansen
By: Charles Turner Brown,
Attorney.

Dec. 29, 1931. F. M. SWANSEN 1,838,591
AUTOMOBILE EQUALIZER
Filed May 15, 1929 2 Sheets-Sheet 2
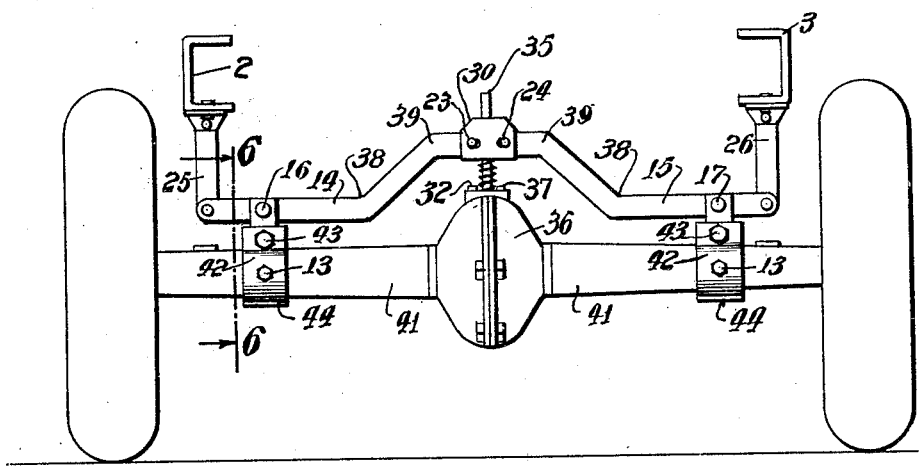
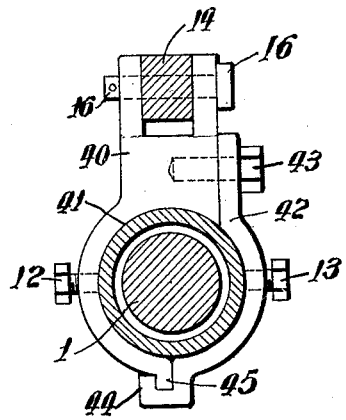
Inventor:
Fredrich M. Swansen
By: Charles Turner Brown
Atty.

Patented Dec. 29, 1931

1,838,591

UNITED STATES PATENT OFFICE

FREDRICK M. SWANSEN, OF CHICAGO, ILLINOIS, ASSIGNOR OF ONE-HALF TO HARRY ELLEFSEN, OF CHICAGO, ILLINOIS

AUTOMOBILE EQUALIZER

Application filed May 15, 1929. Serial No. 363,381.

This invention relates to means whereby the load on the chassis of an automobile will be substantially equalized on the springs thereof which are interposed between said chassis and the rear axle of the automobile.

Among the objects of the invention is to obtain mechanism whereby, when the load is unevenly distributed relative to the sides of the chassis, said load will be carried substantially equally on said springs. An additional object is to obtain mechanism whereby, in case of a sudden movement of one side of the chassis toward the axle of the automobile, and a resulting flattening of the spring adjacent to said side of the chassis, the spring on the other side of said chassis will be simultaneously flattened to substantially the same extent. An additional object is to obtain mechanism of the kind named and for the purpose set forth, which is equally applicable to an automobile having a single or a two part axle. An additional object is to obtain mechanism of the kind and for the purpose described which comprises few parts, which is easily applied to an automobile, which may be readily detached therefrom, which is simple in construction, durable, and not liable to become broken or to get out of order.

I have illustrated a construction embodying my invention, together with a modification of said construction, by said drawings, in which Fig. 1 is an elevation of a one-piece non-rotatable axle, a vertical section of the side members of a chassis, and a rear elevation of a construction embodying the invention mounted on said axle and connecting it to said sides of a chassis Fig. 2 is a top plan view of the members comprising the construction illustrated in Fig. 1 which embody the invention and are attached to the axle, and a horizontal section of the members connecting said parts to the sides of the chassis, taken on line 2—2 of said Fig. 1, viewed as indicated by arrows. Fig. 3 is an elevation of a member forming a fulcrum and a vertical section of the automobile axle which is illustrated in Figs. 1 and 2 and on which said fulcrum member is mounted and of the lever which is fulcrumed on said member, taken on line 3—3 of Fig. 2, viewed as indicated by arrows. Fig. 4 is a side elevation of a portion of said axle, a vertical guide member mounted on said axle, a movable member on said guide and the ends of levers which are attached to said movable member. Fig. 5 is a rear elevation of a two-part automobile differential housing, a vertical section of the sides of a chassis and an elevation of a construction embodying the invention, connecting said housing and sides. And Fig. 6 is a vertical section of the differential housing which is illustrated in Fig. 5, and of the axle therein, a side elevation of a base and fulcrum and a vertical section of a lever mounted on said fulcrum, being a modification of the one illustrated in Fig. 3.

Figs. 3, 4, and 6 are on an enlarged scale from the remaining figures of the drawings.

A reference character applied to designate a given part indicates said part throughout the several figures of the drawings wherever the same appears.

1 represents the axle of an automobile; 2, 3, respectively represent side members of an automobile chassis. 4, 5, respectively, represent springs interposed between axle 1 and sides 2, 3, 6, 7, respectively, represent sprocket wheels which are represented as secured to the rear and driving wheels, 8, 9, said wheels being rotatively mounted on axle 1. 10, 11, respectively represent a combined base and fulcrum which is mounted on axle 1 and held rigidly in place, as by set screws 12, 13. 14, 15, respectively represent levers which are fulcrumed on bolts or pivots 16, 17. 18 represents a standard mounted on axle 1, said standard being substantially vertical and forming a guide for movable member 20 mounted thereon and a base for spring 19. 21, 22, Fig. 4, respectively represent slots in and adjacent to the ends of levers 14, 15; and 23, 24, respectively, represent bolts, pins, or pivots, which extend through apertures provided therefor in movable member 20, and through slots 21, 22 in levers 14, 15. 25, 26, respectively, represent substantially vertical connecting members which are pivoted at their lower ends, as by bolts 27, 28, to the ends of levers 14, 15, and at their upper ends, as by bolts 29, 30, to bases 31, 32. Bases 31, 32, are rigidly secured, as by bolts 33, 34, to the sides 2, 3, of the chassis.

In the modified construction which is illustrated in Figs. 5 and 6, 35 represents a standard which is substituted for standard 18, illustrated in Figs. 1, 2 and 4, and 36 represents the housing of a two-part driving axle and differential thereon. 37 represents cap screws by means of which the standard 35 is mounted on said housing.

In the construction illustrated in said Figs. 5 and 6, the levers 14, 15 are provided with bends 38, 39, respectively, to cause said levers to conform to the housing 36, 41. The standard supporting the fulcrum bolts 16, 17, comprises two parts, 40, 42, which are well illustrated in Fig. 6. The part 40 rests on the part 41 of the housing, and the part 42 is secured to said part 40, as by bolts 43 and interlocking members 44, 45, and said base is rigidly secured in position on said housing, as by set screws 12, 13.

The operation of the equalizer is; when one side of the chassis is forced down by a load thereon, or by a sudden jolt, the connecting member (25 or 26) attached to said side is forced down thereby, turning or rocking the levers 14, 15, on their fulcrums, and bringing the other side of the chassis down.

I claim:

1. In an automobile equalizer, in combination, two-part bases adapted to be mounted on the rear axle of said automobile, a vertical guide on said axle, a movable member on said guide, pivots on said movable member and levers fulcrumed on said bases, means to join one of the ends of said levers to the chassis of said automobile, and means comprising slots in said levers engaged with said pivots to connect the opposite ends of said levers to said movable member.

2. In an automobile equalizer, a plurality of two part bases mounted on the housing of the axle of said automobile one of said parts resting on, extending down one side of and below said housing and the other of said parts extending down the opposite side of said housing to below it and interlocking with the lower end of said first named part and at its upper end joined by bolts thereto, set bolts respectively extending through said parts to co-act with said housing and rigidly hold said base in a determined position thereon, levers pivotally mounted on said bases, in combination with a vertical guide on said housing, a movable member on said guide, means to join adjacent ends of said levers to said movable member, and rods pivotally connected to the opposite ends of said levers and to the chassis of said automobile.

3. In an automobile equalizer, in combination, bases respectively comprising a member provided with a fulcrum and a separable member connected at one end thereof to one end of said fulcrum member and joined at the other end thereof thereto by a bolt, levers fulcrumed on said bases and a laterally movable member, means to pivotally join adjacent ends of said levers to said laterally movable member and pivoted means to join the opposite ends of said levers to the side members of said automobile.

FREDRICK M. SWANSEN.